US005616854A

United States Patent [19]
Berg

[11] Patent Number: 5,616,854
[45] Date of Patent: Apr. 1, 1997

[54] APPARATUS FOR PNEUMATICALLY TESTING PIPES FOR LEAKS

[76] Inventor: Paul Berg, 1046 N. Mapleton Ave., Oak Park, Ill. 60302

[21] Appl. No.: 500,505

[22] Filed: Jul. 11, 1995

[51] Int. Cl.$^6$ .................................................. G01M 3/28
[52] U.S. Cl. ........................ 73/49.1; 73/49.8; 73/49.6; 285/235
[58] Field of Search ........................ 73/40.5 R, 46, 73/49.1, 49.8, 49.5, 49.6; 137/312; 285/65, 68, 69, 114, 115, 163, 235, 236, 337, 133.1, 96, 93, 99

[56] References Cited

U.S. PATENT DOCUMENTS

| 3,871,209 | 3/1975 | Hasha | 73/49.1 |
| 4,059,293 | 11/1977 | Sipler | 285/236 |
| 4,136,552 | 1/1979 | Hasha | 73/46 |
| 4,185,492 | 1/1980 | Hauk et al. | 73/46 |
| 4,194,389 | 3/1980 | Laging | 73/46 |
| 4,458,521 | 7/1984 | Piliette | 73/46 |
| 4,507,954 | 4/1985 | Boutwell | 73/40.7 |

Primary Examiner—Michael Brock
Attorney, Agent, or Firm—Welsh & Katz, Ltd.

[57] ABSTRACT

An apparatus for testing a section of pipe for leaks, includes mirror-image first and second portions each having an attachment assembly for attaching the portion to the section of pipe to be tested, an enclosure device for enclosing the section of pipe, and a sealing element for sealing the attachment assembly to the pipe. Also included is a resilient expansion device for permitting movement of the first portion relative to the second portion to accommodate expansion of the pipe, the expansion device being secured to the first portion and to the second portion.

18 Claims, 3 Drawing Sheets

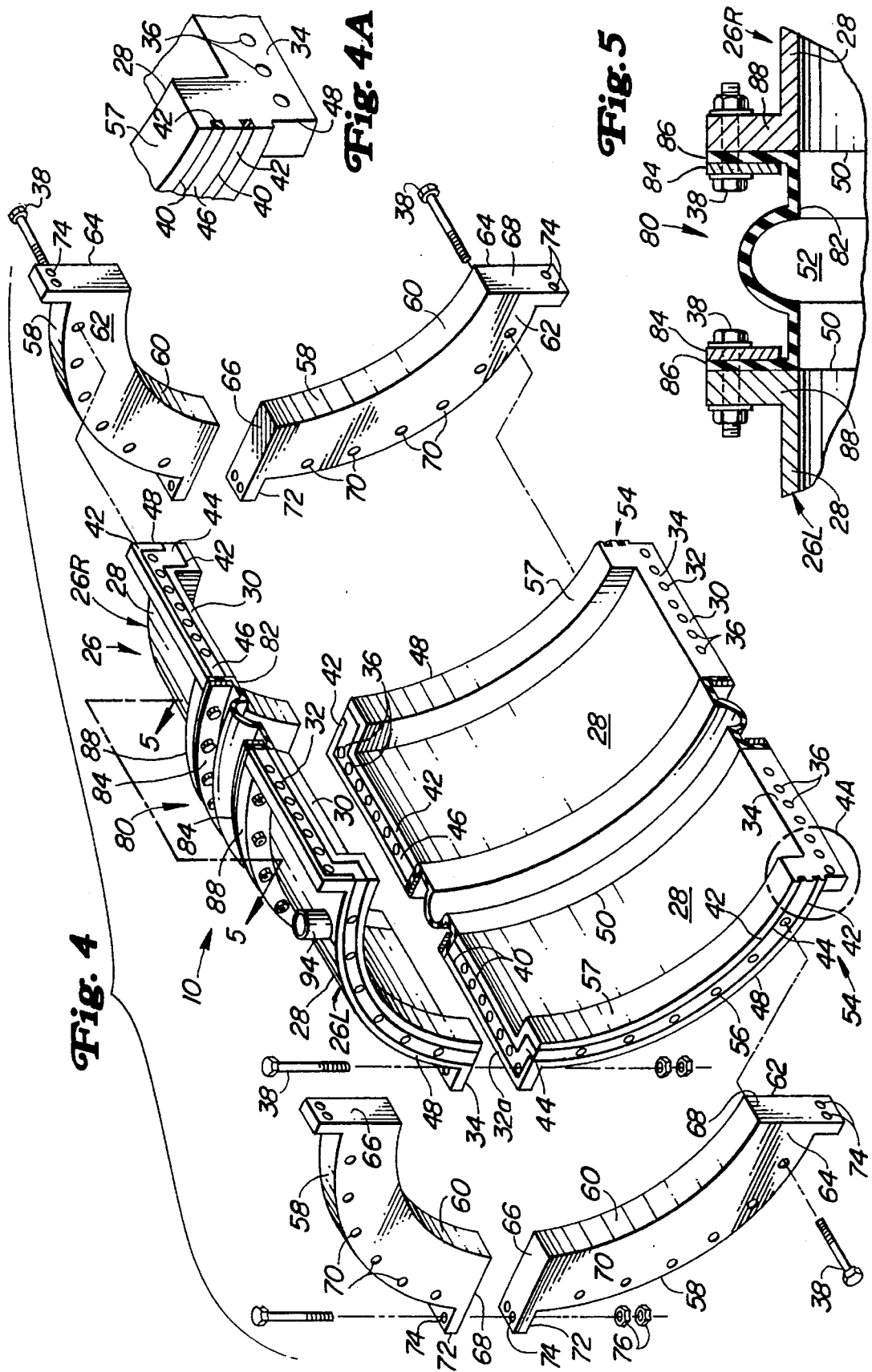

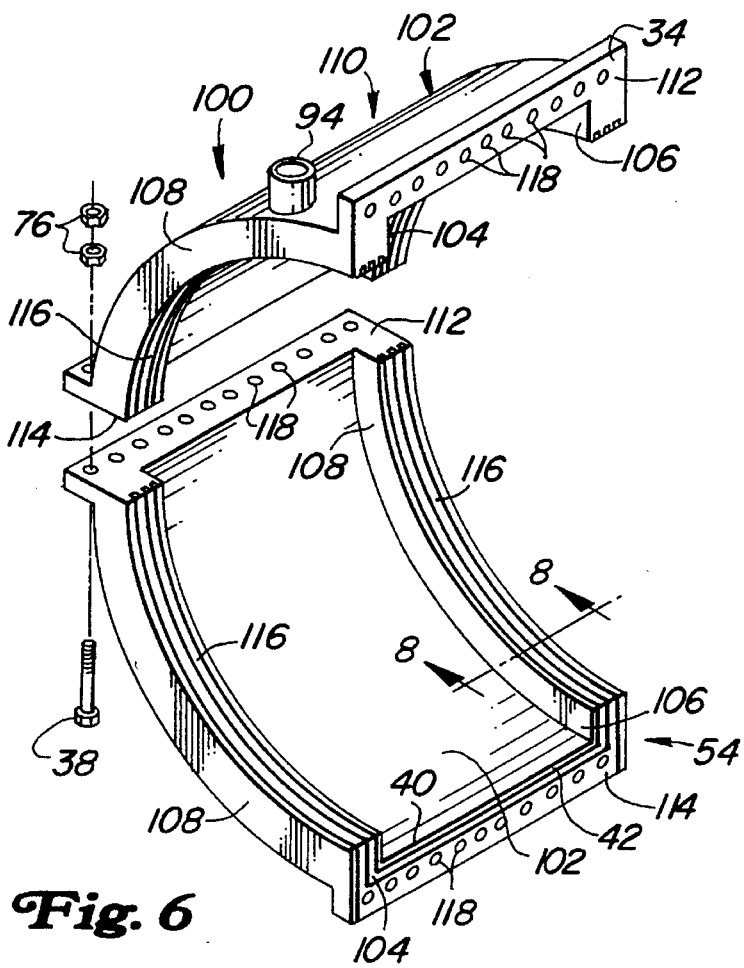
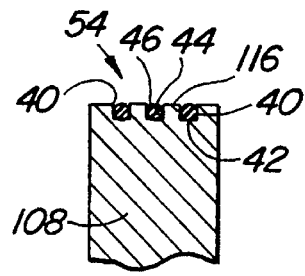
Fig. 8
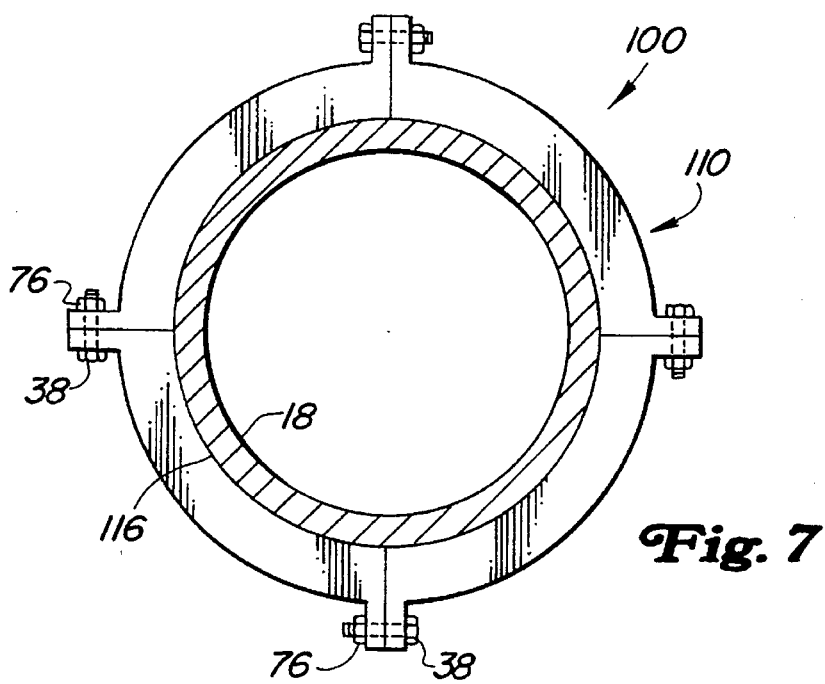
Fig. 7

APPARATUS FOR PNEUMATICALLY TESTING PIPES FOR LEAKS

BACKGROUND OF THE INVENTION

The present invention relates generally to devices for pressure testing sections of pipe to identify and to quantify leakage, and specifically relates to such devices which are designed for pneumatically testing pipe sections equipped with expansion bellows.

Metallic expansion bellows are used on piping penetrations of containment drywells in many nuclear power plants as part of the containment insolation scheme. Typical bellows construction is of stainless steel and is two-ply, with a small annulus or gap between the inner and outer piles. This annulus is intended to permit periodic pressure testing for leak quantification. In nuclear power plants, metallic expansion bellows provide flexible attachment points fore process pipes in fluid communication with containment drywells. The purpose of these bellows is to accommodate relative motion between the process pipes and the containment vessel resulting from thermal expansion and pressure displacement. These conditions may occur during normal operation, as well as during accident conditions.

Although the overall performance of flexible metallic bellows penetrations has appeared to be acceptable for approximately 20 years, degradation of these components has been recently has been recently identified. Also, recently discovered deficiencies in the conventional pressure test scenario have caused concern as to the inability of regulators to accurately quantify the rate of leakage from a cracked bellows.

Conventional bellows leak rate follow one of two basic formats. The first is referred to as a leak rate test, in which the annulus between the inner and outer bellows plies is filled with a pressurized fluid, preferably air, from a remote pressure source. The goal is to maintain a specified, relatively constant pressure rating, such as 48 psi. The test measures the flow rate of pressurized fluid necessary to maintain the specified pressure. In the second test format, termed the pressure decay test, the annulus is pressurized to a specified value, and the decline of pressure over time is monitored and compared with optimum rates.

Basically, it has been found that in some cases, the plies of the bellows become crimped or pinched in random locations along the length of the bellows to the extend that the annulus between the inner and outer plies becomes completely closed, or restricts the flow of the pressurizing fluid. Should such a deformation occur upstream of an actual leak, the conventional pressure test scenarios will not discover the leak. Consequently, the nuclear regulatory establishment has been searching for an accurate system for leak rate testing of metallic expansion bellows.

Accordingly, it is a principal object of the present invention to provide an apparatus for accurately performing leak rate tests on pipe, and specifically, on sections of pipe equipped with metallic expansion bellows.

It is another object of the present invention to provide and apparatus for performing leak rate tests on pipe which also provides protection of the tested section of pipe from external damage.

It is yet another object of the present invention to provide an apparatus for performing leak rate tests on pipe which may be readily removed after testing and reused at another test sits.

It is a further object of the present invention to provide an apparatus for performing leak rate tests on pipe which may be left permanently installed after testing but still allow for easy access to the encompassed pipe section through partial disassembly of the apparatus. At the same time, the apparatus is designed to absorb any movements of the encased pipe while offing minimal resistance to such movement.

It is still another object of the present invention to provide an apparatus for performing leak rate tests on metallic expansion bellows which is compatible with existing pressure testing equipment.

SUMMARY OF THE INVENTION

The above-identified objects are met or exceeded by the present invention, in which a testing device is provided for leak rate testing a bellows by creating a sealed pressure chamber around the bellows. The present leak rate testing apparatus may be readily assembled about any bellows, as either a permanent or temporary installation. If a temporary installation is desired, the present apparatus may be reused at another site.

More specifically, the present invention provides an apparatus for testing a section of pipe for leaks, including mirror-image first and second portions each having an attachment assembly for attaching the portion to the section of pipe to be tested, and enclosure device for enclosing the section of pipe, and a sealing element for sealing the attachment assembly to the pipe. Also included is a resilient expansion device for permitting movement of the first portion relative to the second portion to accommodate expansion of the pipe, the expansion device being secured to the first portion and to the second portion.

An advantage of the present invention is that the permanent mounting of the attachment assembly to the pipe permits a positively sealed relationship about the pipe, and creates a protective covering over the bellows area. Further, the resilient expansion device forms a sealing enclosure about the pipe to be tested, yet permits the first and second portions to move relative to each other for accommodating axial expansion of the bellows.

In another embodiment, the apparatus for pressure testing a section of pipe for leaks includes a plurality of left enclosure shell sections and a like plurality of right enclosure shell sections, each of such shell sections having an inner edge, an outer edge, and first and second axial edges, each of such left and right shell sections are configured to be sealingly secured to corresponding adjacent left and right shell sections along axial edges to circumscribe the section of the pipe to be tested, and upon assembly the shell sections form a left enclosure assembly and a right enclosure assembly. Also included are end rings for attachment to each outer edge of the left and right enclosure sections and for securing the sections to the pipe to be tested. Also included are sealing devices for sealing the apparatus about the pipe to be tested, and expansion devices for expandably joining the inner edges of the adjacent sections together to define an enclosed pressurizable chamber.

In another embodiment, an apparatus for pressure leak testing a section of pipe equipped with a metallic expansion bellows includes an enclosure housing having a plurality of arcuate enclosure sections configured to be sealingly secured to adjacent sidewall sections along corresponding edges to circumscribe the section of pipe to be tested. Each enclosure section has first and second endwall portions extending radially toward the section of pipe, and includes an endwall sealing device associated with each endwall portion which is constructed and arranged for being compressed against the pipe to pneumatically seal the enclosure housing to the pipe.

BRIEF DESCRIPTION OF THE DRAWINGS

FIG. 4 is an exploded fragmentary perspective view of the device shown in FIG. 1;

FIG. 4A is an enlarged fragmentary perspective view of a portion of FIG. 4;

FIG. 5 is a fragmentary sectional view taken along the line 5—5 of FIG. 4 and in the direction indicated generally;

FIG. 6 is an exploded fragmentary perspective view of and alternate embodiment of the device shown in FIG. 1;

FIG. 7 is an elevational end view of the device depicted in FIG. 6 with the penetration sleeve shown in section; and FIG. 8 is a sectional view taken along the line 8—8 of FIG. 6.

DETAILED DESCRIPTION OF THE PREFERRED EMBODIMENT

Figure 1:
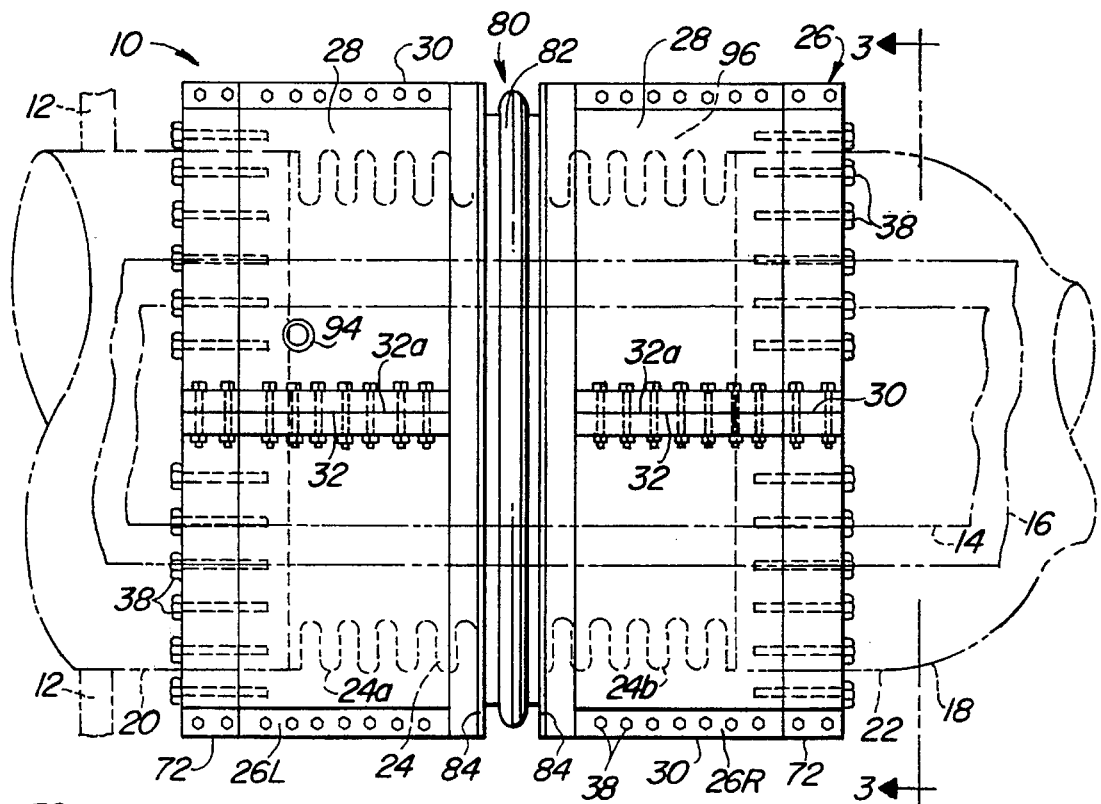
FIG. 1 is an overhead plan view of the present leak testing device, shown assembled upon a section of pipe which is depicted in phantom.

Referring now to the drawings, and in particular FIGS. 1 and 4, the present pneumatic leak testing device is indicated generally as 10, and is shown installed on a portion of process pipe of a nuclear power plant adjacent to the penetration point of the pipe into the containment drywell 12 (shown in phantom). A process pipe 14 (shown in phantom) is shown provided with a radially spaced guard pipe 16 (shown in phantom). Outside the guard pipe 16 is a radially-spaced, tubular drywell penetration sleeve or pipe 18 (shown in phantom), having a drywell side 20 and a flued head side 22 which is equipped with at least one metallic expansion bellows 24, designated 24a and 24b (shown in phantom).

The testing apparatus 10 includes an enclosure housing generally designated 26, which is configured for assembly about the drywell penetration sleeve 18 at the location of the bellows 24. The housing 26 has a plurality of elongate, arcuate enclosure shell sections 28 configured to be sealingly secured to adjacent shell sections along corresponding axial edges 30 to circumscribe the section of penetration sleeve 18 to be tested. The axial edges 30 are substantially parallel to the longitudinal axis of the sleeve 18, as well as the pipe 14.

In the preferred embodiment, two enclosure housing assemblies are contemplated, designated 26L for the left-sided assembly, and 26R for the right-sided assembly. Also, four sections 28 are contemplated for each assembly 26L, 26R; however the specific number of sections may vary depending on the application, and the diameter of the sleeve 18 to be tested.

Each axial edge 30 has a radially-projecting sidebar 32 has a coupling flange 34 which engages like features of adjacent sections 28 for assembly of the apparatus 10. To maintaining a sealed connection between adjacent sections, coupling flanges 34 are provided with a plurality of threaded bores 36 located in spaced linear relation to each other, and which are transverse to the longitudinal axis of the sleeve 18. The coupling flanges 34 facilitate the fastening of adjacent sections together by threaded fastener 38, such as bolts. It is contemplated, however, that other suitable fastening devices could be employed to achieve the desired pressure-tight attachment.

It is preferred that one of the sidebars 32a be provided with a pair of spaced, parallel sealing grooves 40 into which a resilient packing ring or dam 42 is inserted. Grooves 40 are preferably machined into the sidebar 32, however other fabrication technologies are contemplated, such as casting. The packing dams 42 are preferably made of graphite. The grooves 40 define a space 44 therebetween into which a bead of an elastomeric, caulk-type sealant 46 is injected. In the preferred embodiment, the sealant 46 is a mixture of an elastomer, such as an organmetaloxide polymer sold under the trade name No. 6 Sealant, and an inorganic fiber material sold under the trade name G-Fiber, both ingredients being manufactured and mixed by Team, Inc., P.O. Box 123, Alvin Tex. however, it is contemplated that , depending on the particular application and environmental considerations, other suitable elastomeric injectable sealant may be utilized.

The sealing grooves 40 and packing dams 42 are disposed on only the sidebar 32a of each shell section 28 so that as the shell assembly 26L, 26R, is assembled about the sleeve 18, a sealing relationship will be created between one of the relatively "smooth" coupling flanges 34 and a grooved sidebar 32a of an adjacent shell section 28.

In addition to the radial edges 30, each enclosure shell section 28 also has an outer edge 48 and an inner edge 50. The inner edges 50 of opposing assemblies 26L and 26R face each other and are axially displaced to form a gap 52 therebetween. The outer edges 48 are each provided with a sealing grove assembly 54 similar to the sidebar 32a, and includes a pair of sealing groves 40 dimensioned to retain packing dams 42 therein, and defining a now arcuate space 44 for the injected sealant 46. The space 44 also includes a plurality of threaded counterbores 56 which are dimensioned to receive bolts 38 or other suitable fasteners.

In the embodiment illustrated in FIGS. 1–5, the outer edges 48 each include a radially extending portion 57 which extends toward the sleeve 18. It will be appreciated, however, that the outer edge 48 may be provided in other configurations, including but not limited to an axial extension of the other surface of each shell section 28 which does not have an extension 57. The important factor is that the outer edges 48, 50 provide a sealable and secure mounting point for an arcuate end ring 58.

Attached to each of the other edges 48 is one of the arcuate end rings 58, each of which has substantially the same chordal dimension as the corresponding shell section 28. Each end ring 58 includes an inner surface 60 which contacts the sleeve 18, a first surface 62 which engages the corresponding outer edge 48, a second surface 64 opposite the first surface, and first and second ends 66, 68 to corresponding ends of adjacent end rings to circumscribe the sleeve 18.

Each end ring 58 includes an arcuate array of throughbores 70 through which pass the fasteners, preferably bolts 38 to engage the counterbores 56 and secure the end ring to the corresponding enclosure shell section 28. In addition, each end ring 58 also has a mounting ear 72 provided with at least one throughbore 74 through which pass bolts 38 for securing adjacent end rings together. At least one and preferably two locknuts 76 engage the bolts 38 to secure the end rings together.

Figure 2:
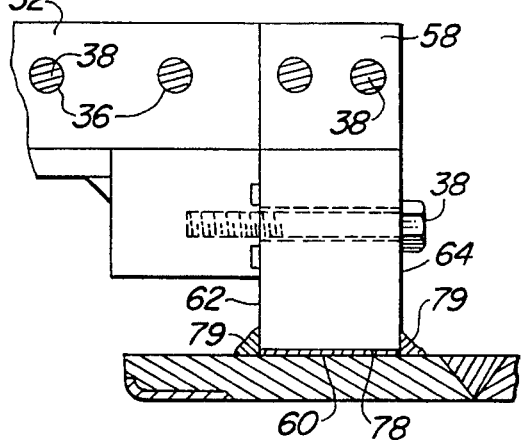
FIG. 2 is an enlarged fragmentary view of the attachment and seal assembly used to secure the present leak testing device to the pipe.
Figure 3:
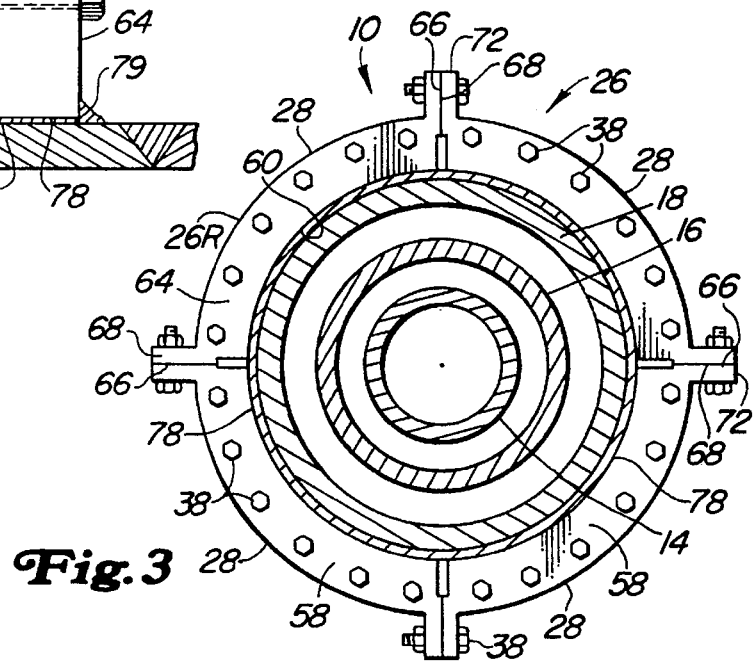
FIG. 3 is a sectional view taken along the line 3—3 of FIG. 1 and in the direction indicated generally.

Referring now to FIG. 2, an important feature of the embodiment of FIGS. 1–5 is that the device 10 is mounted permanently to the sleeve 18. This permanent mounting is achieved by welding the end rings 58 along the abutment of the inner surfaces 60 against the sleeve 18. In FIG. 2, this weldment is indicated at 78, includes a tack weld 79 at each corner seam for strength, and is found on both surfaces 62, 64 of the end ring 58.

It will be seen that the welding joint 78 provides a permanent and gas-tight around the sleeve 18. Furthermore, by permanently mounting the device 10 at the bellows 24, pressure tests may be made on a regular basis. An additional advantage is that the device 10 provides a protective cover for the bellows 24.

Upon assembly of each of the assemblies 26L, 26R together and to the corresponding end ring 58, the shell sections 28 are cantilevered from the corresponding end rings so that the opposing inner edges 50 are axially displaced from each other across the gap 52, and retain the expansion capability of the bellows 24, the device 10 is provided with its own expansion device, generally designated 80.

The expansion device 80 includes an elastomeric joint 82 which is preferably made of a material which is durable, resilient, resistant to environmental degradation, airtight, and pressure retentive. In the preferred embodiment, the joint material is a multi-ply elastomer with plies of polyester or Kerlar fabric coated with Neopren or Viton elastomer. A suitable product is made by Unaflex, Inc. and sold under Style 600 Single Open-Arch Belt-type Expansion Joint. However, it is contemplated that other equivalent elastomeric materials may be employed, depending on the application.

Also included as part of the expansion device 80 are a pair of compression/clamping bands 84 which secure joint flange 86 of the elastomeric joint to corresponding assemblies 26L, 26R. More specifically, each shell section 28 has at its inner edge 50 a vertically projecting attachment wall 88 having a plurality of spaced counterbores 90 (best seen in FIG. 5). Each compression band 84 has a like plurality of through-bores 92 which are in registry with the counterbores 90. Bolts 38 or other fasteners are inserted through the band 84, the joint flange 86 and engage the counterbores 90. Upon tightening of the fasteners 38, the band 84 exerts a compression force on the joint flange 86. thus creating a positive, gas-tight seal against the attachment wall 88.

If desired, additional injected sealant 46 may be applied between the interface of the joint flange 86 and the attachment wall 88 to provide a more positive seal. Also, it will be understood that the joint 82 is an elongate strip with preformed arch which is wrapped around the circumference of the sleeve 18 to be secured to the device 10. Consequently, there will be a seam (not shown) of sheet-to-sheet contact, which may be sealed with the sealant 46, by cold or hot vulcanization or other conventionally available elastomeric sealing technologies. In addition, mechanical belt attachment devices such as belt joiners may be employed such as are used on endless conveyor belts.

It is also contemplated that the present compression band 84 may be replaced by other suitable equivalent elastomeric flange fastening technology. As is typical in such leak testing vessels, an accessible pressure fitting 94 is provided to permit fluid communication between ambient and the test enclosure 96 defined by the device 10 (best seen in FIG. 1). Through the fitting 94, pressurized air is injected and/or leak rates are monitored to determine the integrity of the bellows 24.

In operation, the end rings 58 are secured to each other by the mounting ears 72 and then weld to the sleeve 18 to form a circumscribing ring on either side of, and being slightly laterally displaced from, the bellows 24. It is important that the weldment 78 be carefully made to be continuous so that a gas-tight seal is made. Upon attachment of the end rings 58, the assemblies 26L and 26R are assembled together along opposing axial edges 32, 32a on either side of the gap 52. At each joint of adjacent shell sections 28, the sealant 46 is injected into the space 44 between the packing dams 42. The sealant also functions to seal the openings through which the fasteners 38 pass. Each assembly 26L, 26R is then bolted to the corresponding assembly of end rings 58.

The elastomeric joint 82 is then wrapped around the sleeve 18 in the area of the gap 72, sealed to itself, and attached to the attachment wall 88 using the compression bands 84, the corresponding fasteners 38, and any necessary sealant. Before final tightening of all of the bolts 38, additional sealant 46 is preferably applied. It will be appreciated that the above-identified assembly sequence is provided as an example only, and alternate sequences may be employed depending on the application.

Upon assembly of the sheet to the assemblies 26L, 26R, the device 10 is in condition to test the integrity of the bellows 24. Such tests may take the form of the pressure decay test or the leak rate test described above. The enclosure 96 is defined by the device 10 about the sleeve 18.

Referring now to FIGS. 6, 7 and 8, an alternate embodiment of the device 10 is indicated, and is designated 100. The main distinction between the device 10 and the device 100 is that the device 100 is not fixed to the sleeve 18, but is totally removable. An advantage of such removability is that the bellow 24 may be more accessible for repair or replacement than with the permanently mounted device 10.

In structural terms, the major differences between the device 10 and the device 100 is that the device 100 does not have an elastomeric expansion device similar to the sheet 82. Also, each enclosure section, designated 102, has at its first and second edges 104, 106 a depending end wall 108 which replaces the separate end rings 58 and forms the engagement surface with the sleeve 18. Further details of the device 100 will become evident from the following discussion of FIGS, 6–8, wherein components which are identical to those depicted in FIGS. 1–5 designated with identical reference numerals.

The testing device 100 includes an enclosure housing 110 which is also configured for assembly about the drywell penetration sleeve 18 at the location of the bellows 24, and is made up of the assembled arcuate enclosure sections 102. The enclosure sections are configured to be assembled to adjacent sections to circumscribe the sleeve 18 in the same manner as the assemblies 26L and 26R. Each enclosure section 102 is provided with an axial length which will at least span the bellows 24. At each first and second edge 104, 106 is provided the integral end wall 108, which incorporates some of the functions of the end ring 58.

Also included on each enclosure section 102 are a pair of axial edges 112, 114, one of which, edge 112, includes a coupling flange 34, and the other of which has a sealing groove assembly 54 which includes the pair of spaced, parallel sealing grooves 40 each dimensioned to accommodate a packing dam 42 therein. Also, the grooves 40 define a space 44 into which the injectable sealant 46 may be injected. As in the case with the device 10, upon assembly of adjacent enclosure sections 102, coupling flanges 34 will abut the packing dam 42 and sealant 46 of adjacent sections.

Since the device 100 lacks the positive welded engagement with the sleeve 18 provided by the end rings 58, and alternate sealing mechanism is required to form a gas-tight seal about the sleeve. Such a seal is provided by the end walls 108, which include a sealing groove assembly 54 including the packing dam 42, the space 44, and the sealant 46 along each inner surface 116. Also, each axial edge 112, 114 is provided with a plurality of spaced mounting throughbores 118. Suitable fasteners 38 such as bolts and lockwashers 76 are inserted through the thoroughbores 118 to secure the adjacent enclosure sections 102 together. In addition, a pressure fitting 94 is provided to the enclosure assembly 110 for testing purposes.

As the enclosure assembly 110 is assembled around the sleeve 18, sufficient compression forces are generated by the end walls 108 against the sleeve to compress the packing dams 42 and create a gas-tight seal, albeit a temporary one. In that the device 100 is only temporarily mounted to the sleeve, there is no need to provide a mechanism for accommodating expansion of the bellows 24, as is the case with the permanently mounted device 10.

In operation, the device 100 is similar to the device 10, in that the same sort of tests are performed on each device to determine leak rates of expansion bellows 24.

While a particular embodiment of the apparatus for pneumatically testing pipes for leaks of the invention has been shown and described, it will be appreciated by those skilled in the art that changes and modifications may be made thereto without departing from the invention in its broader aspects and as set forth in the following claims.

What is claimed is:

1. An apparatus for testing a section of pipe for leaks, comprising:
    a first portion having an attachment means for attaching said portion to the section of pipe to be tested, an enclosure means for enclosing the section of pipe, and sealing means for sealing said attachment means to the pipe;
    a second portion having a second portion attachment means for attaching said second portion to the section of pipe to be tested, an enclosure means for enclosing the section of pipe, second portion sealing means for sealing said second portion attachment means to the pipe; and
    resilient expansion means for permitting movement of said first portion relative to said second portion to accommodate expansion of the pipe, said expansion means being secured to said first portion and to said second portion.

2. The apparatus as defined in claim 1 wherein said first portion is substantially a mirror image of said second portion.

3. The apparatus as defined in claim 1 wherein said attachment means includes a plurality of arcuate end rings configured for securing a corresponding one of said enclosure means to the pipe.

4. The apparatus as defined in claim 3 wherein said sealing means includes a weldment securing an inner surface of each said end ring to the pipe.

5. The apparatus as defined in claim 4 wherein said sealing means further includes means for sealing said enclosure means to said attachment means, said sealing means including at least one sealing groove on said attachment means.

6. The apparatus as defined in claim 5 wherein said sealing means further includes a pair of said sealing grooves in generally parallel orientation, and a space for an injection sealant disposed therebetween.

7. The apparatus as defined in claim 1 wherein said enclosure means includes a plurality of arcuate enclosure sections each having an outer edge configured for attachment to a corresponding attachment means, and a pair of axial edges configured for attachment to adjacent enclosure sections.

8. The apparatus as defined in claim 7 wherein each said enclosure section has a sealing groove assembly disposed between said outer edge and the corresponding attachment means, and between each said axial edge and the adjacent enclosure section.

9. The apparatus as defined in claim 1 wherein said first and second portions are axially displaced from each other on the pipe defining a gap therebetween, and said resilient expansion means includes an elastomeric joint disposed between opposing edges of said enclosure means.

10. The apparatus as defined in claim 9 each said enclosure means is an arcuate enclosure shell having a pair of axial edges, an outer edge configured for attachment to said attachment means, and an inner edge configured for attachment to a corresponding edge of said elastomeric joint.

11. The apparatus as defined in claim 1 wherein said expansion means is a joint of elastomeric material, and further including means for attaching said elastomeric joint to said enclosure means.

12. The apparatus as defined in claim 11 wherein said means for attaching includes a compression bar for compressing an edge of said elastomeric joint to a corresponding edge of said enclosure means.

13. The apparatus as defined in claim 1 further including means for introducing a pressured gas into an enclosed area defined by said apparatus.

14. An apparatus for testing a section of pipe for leaks, comprising:
    a plurality of left enclosure shell sections and a like plurality of right enclosure shell sections, each said shell section having an inner edge, an outer edge, and first and second axial edges, each said left and right shell section configured to be sealingly secured to corresponding adjacent left and right shell sections along said axial edges to circumscribe the section of pipe to be tested, upon assembly said shell sections forming a left enclosure assembly and a right enclosure assembly;
    end ring means for attachment to each said outer edge of said left and right shell sections and for securing said sections to the pipe to be tested;
    sealing means for sealing said apparatus about the pipe to be tested; and
    expansion means for expandably joining said inner edges of adjacent shell sections together to define an enclosed pressurizable chamber.

15. The apparatus as defined in claim 14 wherein said sealing means includes a weldment securing an inner surface of each said end ring means to the pipe.

16. The apparatus as defined in claim 15 wherein said sealing means further includes means for sealing each said shell section to said corresponding end ring means, said sealing means including at least one sealing groove on each said shell.

17. The apparatus as defined in claim 16 wherein said sealing means further includes a pair of said sealing grooves in generally parallel orientation, and a space for an injected sealant disposed therebetween.

18. The apparatus as defined in claim 14 wherein said expansion means includes an elastomeric joint spanning a distance separating said left and right enclosure sections, and further including clamping means for sealingly securing said joint to said enclosure sections.

* * * * *